(12) United States Patent
Miura et al.

(10) Patent No.: US 10,737,731 B2
(45) Date of Patent: Aug. 11, 2020

(54) VEHICLE FRONT PILLAR STRUCTURE AND VEHICLE SIDE STRUCTURE

(71) Applicant: TOYOTA JIDOSHA KABUSHIKI KAISHA, Toyota-shi (JP)

(72) Inventors: Takuya Miura, Toyota (JP); Motoya Sakabe, Nisshin (JP); Kazuki Furukawa, Miyoshi (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/214,185

(22) Filed: Dec. 10, 2018

(65) Prior Publication Data

US 2019/0225275 A1 Jul. 25, 2019

(30) Foreign Application Priority Data

Jan. 22, 2018 (JP) ................................ 2018-008109

(51) Int. Cl.
| | |
|---|---|
| *B62D 25/04* | (2006.01) |
| *B60J 5/04* | (2006.01) |
| *B60R 13/02* | (2006.01) |
| *B60J 1/02* | (2006.01) |

(52) U.S. Cl.
CPC ............. *B62D 25/04* (2013.01); *B60J 1/02* (2013.01); *B60J 5/0422* (2013.01); *B60R 13/025* (2013.01); *B60R 2013/0287* (2013.01)

(58) Field of Classification Search
CPC ..... B60J 1/06; B60J 5/042; B60J 5/044; B60J 5/0422; B60J 5/0423; B60J 5/40426

USPC .............. 296/193.06, 96.18, 203.01–203.03, 296/187.09, 187.1

See application file for complete search history.

(56) References Cited

U.S. PATENT DOCUMENTS

| | | | |
|---|---|---|---|
| 2007/0216189 A1* | 9/2007 | Matsumoto ............ | B62D 25/04 296/96.21 |
| 2011/0248525 A1* | 10/2011 | Lundstroem ........... | B62D 25/04 296/191 |

FOREIGN PATENT DOCUMENTS

| | | | | |
|---|---|---|---|---|
| EP | 2371678 A1 | * | 10/2011 | ............. B62D 25/04 |
| JP | 63-142276 | | 9/1988 | |
| JP | 2013-112077 | | 6/2013 | |
| KR | 101123514 B1 | * | 3/2012 | |

* cited by examiner

*Primary Examiner* — Dennis H Pedder
(74) *Attorney, Agent, or Firm* — Oblon, McClelland, Maier & Neustadt, L.L.P.

(57) ABSTRACT

A vehicle front pillar structure includes: a pillar lower portion that configures a lower portion of a front pillar; a first pillar frame that extends along an outer edge of a windshield of a vehicle in a vehicle width direction; a second pillar frame that extends in an extending direction of the first pillar frame; a transparent member straddling between the first pillar frame and the second pillar frame; and a load transmission member that can transmit a load applied from a vehicle front side to a front side portion of the upper portion of the pillar lower portion in a vehicle longitudinal direction, to the second pillar frame, wherein a top surface of the second pillar frame is disposed continuously from a top surface of the load transmission member, and the top surface of the second pillar frame linearly extends in a vehicle rearward and upward direction.

6 Claims, 3 Drawing Sheets

VEHICLE FRONT PILLAR STRUCTURE AND VEHICLE SIDE STRUCTURE

CROSS-REFERENCE TO RELATED APPLICATION

This application is based on and claims priority under 35 USC 119 from Japanese Patent Application No. 2018-008109 filed on Jan. 22, 2018, the disclosure of which is incorporated by reference herein.

BACKGROUND

Technical Field

The present disclosure relates to a vehicle front pillar structure and a vehicle side structure.

Related Art

To ensure occupants' visibility, vehicle pillars that are configured to have windows are known (refer to Japanese Patent Application Laid-Open No. 2013-112077 and Japanese Utility Model Application Laid-Open No. S63-142276). For example, Japanese Patent Application Laid-Open No. 2013-112077 discloses a technology in which a window frame is formed in an upper half of a front pillar, and corner window glass is fitted into the window frame. To be brief, in the technology, a front pillar upper portion constitutes a front vertical side of the window frame in a vehicle longitudinal direction, and a sub-pillar constitutes a rear vertical side of the window frame in the vehicle longitudinal direction. The front pillar upper portion and the sub-pillar are joined to a rail front portion of a roof side rail at their top ends. The front pillar upper portion and the sub-pillar are joined to a front pillar lower portion at their bottom ends. According to this structure, an occupant can view the outside of a vehicle through the corner window glass.

However, in the prior art, a collision load in a frontal collision concentrates on the front pillar upper portion, which constitutes a front side of the window frame in the vehicle longitudinal direction, of the front pillar, and therefore, the front pillar upper portion is required to be thick. The thicker the front pillar upper portion, the larger visible area is blocked.

SUMMARY

Considering the circumstances described above, the present disclosure aims at providing a vehicle front pillar structure and a vehicle side structure in which, even if a pillar frame that constitutes a front side of a window of a front pillar, in a vehicle longitudinal direction, has a limited thickness, deformation of the front pillar in a frontal collision can be restrained.

A vehicle front pillar structure according to a first aspect of the present disclosure includes a pillar lower portion that configures a lower portion of a front pillar; a hollow, column-shaped first pillar frame that extends along an outer edge of a windshield of a vehicle in a vehicle width direction, a bottom end of the first pillar frame being secured to a top end of the pillar lower portion; a hollow, column-shaped second pillar frame that is provided on a vehicle rear side of the first pillar frame so as to form a gap, the second pillar frame extending in an extending direction of the first pillar frame, and a bottom end of the second pillar frame being secured to the top end of the pillar lower portion; a transparent member that is made of a transparent material, the transparent member straddling between the first pillar frame and the second pillar frame; and a load transmission member that is disposed on a vehicle lower side of the bottom end of the first pillar frame, the load transmission member being joined to an upper portion of the pillar lower portion, and the bottom end of the second pillar frame being joined to the load transmission member, such that the load transmission member can transmit a load applied from a vehicle front side to a front side portion of the upper portion of the pillar lower portion in a vehicle longitudinal direction, to the second pillar frame, wherein a top surface of the second pillar frame is disposed continuously from a top surface of the load transmission member, and the top surface of the second pillar frame linearly extends in a vehicle rearward and upward direction.

According to the structure, since the transparent member straddles between the first pillar frame and the second pillar frame, an occupant inside the vehicle can view the outside of the vehicle through the transparent member between the first pillar frame and the second pillar frame. To the load transmission member, which is joined to the upper portion of the pillar lower portion, the bottom end of the second pillar frame is joined. Accordingly, the load transmission member can transmit the load that is applied from the vehicle front side to the front side portion of the upper portion of the pillar lower portion in the vehicle longitudinal direction, to the second pillar frame. The top surface of the second pillar frame is disposed continuously from the top surface of the load transmission member, and linearly extends in the vehicle rearward and upward direction. Therefore, a part of a load that is applied from the vehicle front side to the front pillar in a frontal collision is efficiently transmitted along the top surface of the load transmission member to the top surface of the second pillar frame. Therefore, in the frontal collision, since the second pillar frame partly shares the load that is applied to the front pillar in the frontal collision, it is possible to restrain deformation of the front pillar in the frontal collision, even if the thickness of the first pillar frame is limited.

According to a vehicle front pillar structure of a second aspect of the present disclosure, in the first aspect, the load transmission member includes a first upper ridge that linearly extends along an inner edge of the top surface of the load transmission member in the vehicle width direction. The second pillar frame includes a second upper ridge that linearly extends along an inner edge of the top surface of the second pillar frame. The second upper ridge is disposed continuously from the first upper ridge.

According to the structure, the linear second upper ridge, which extends along the inner edge of the top surface of the second pillar frame in the vehicle width direction, is disposed continuously from the linear first upper ridge, which extends along the inner edge of the top surface of the load transmission member in the vehicle width direction. Therefore, a part of a load that is applied from the vehicle front side to the front pillar in a frontal collision is more efficiently transmitted along the first upper ridge of the load transmission member and the second upper ridge of the second pillar frame.

According to a vehicle front pillar structure of a third aspect of the present disclosure, in the first or second aspect, the front side portion of the upper portion of the pillar lower portion, in the vehicle longitudinal direction, has a front vertical wall extending along a vehicle vertical direction and the vehicle width direction. The load transmission member is disposed in a state of being bumped against the front vertical wall. The load transmission member is configured to have a portion that is joined to the front vertical wall.

According to the structure, the load transmission member is disposed in a state of being bumped against the front vertical wall, and is configured to have the portion that is joined to the front vertical wall. Therefore, a part of a load that is applied from the vehicle front side to the front pillar in a frontal collision is efficiently transmitted from the front vertical wall of the pillar lower portion to the load transmission member.

According to a vehicle front pillar structure of a fourth aspect of the present disclosure, in any one of the first to third aspects, the top surface of the load transmission member is inclined in a vehicle upward direction on a vehicle rear side.

According to the structure, a part of a load that is applied from the vehicle front side to the front pillar in a frontal collision is transmitted along the top surface of the load transmission member in a vehicle rearward and upward direction. Therefore, the load that is transmitted along the top surface of the load transmission member is more efficiently transmitted to the top surface of the second pillar frame.

A vehicle side structure according to a fifth aspect of the present disclosure includes a front pillar to which the vehicle front pillar structure according to any one of the first to fourth aspects is applied; a front side door that opens and closes a front door opening portion in a vehicle side, the front pillar being provided at a front edge of the front door opening portion; and a belt line reinforcing member that is provided inside the front side door, the belt line reinforcing member being disposed along a belt line, and the belt line reinforcing member including a first ridge extending along the vehicle longitudinal direction, in a closed state of the front side door. The load transmission member includes a second ridge extending along the vehicle longitudinal direction. A rear end of the second ridge is set in a position that can transmit a load from a vehicle front side to a front end of the first ridge, in the closed state of the front side door.

According to the structure, the first ridge of the belt line reinforcing member extends in the vehicle longitudinal direction, in the closed state of the front side door, and the second ridge of the load transmission member also extends in the vehicle longitudinal direction. Note that, the concept of "extending in the vehicle longitudinal direction" includes, as well as extending horizontally along the vehicle longitudinal direction, extending toward the vehicle rear side along the vehicle longitudinal direction, while being slightly inclined to one side of the vehicle vertical direction. The rear end of the second ridge of the load transmission member is set in a position that can transmit a load from the vehicle front side to the front end of the first ridge of the belt line reinforcing member, in the closed state of the front side door. Therefore, a part of a load that is applied from the vehicle front side to the load transmission member in a frontal collision is transmitted along the second ridge of the load transmission member to the rear end thereof, and then is efficiently transmitted along the first ridge of the belt line reinforcing member.

As described above, the vehicle front pillar structure and the vehicle side structure according to the present disclosure have the beneficial effect of restraining deformation of the front pillar, in a frontal collision, even if the thickness of the first pillar frame, which constitutes the front side of the window of the front pillar in the vehicle longitudinal direction, is limited.

BRIEF DESCRIPTION OF THE DRAWINGS

Exemplary embodiments of the present disclosure will be described in detail based on the following figures, wherein.

DETAILED DESCRIPTION

Figure 1:
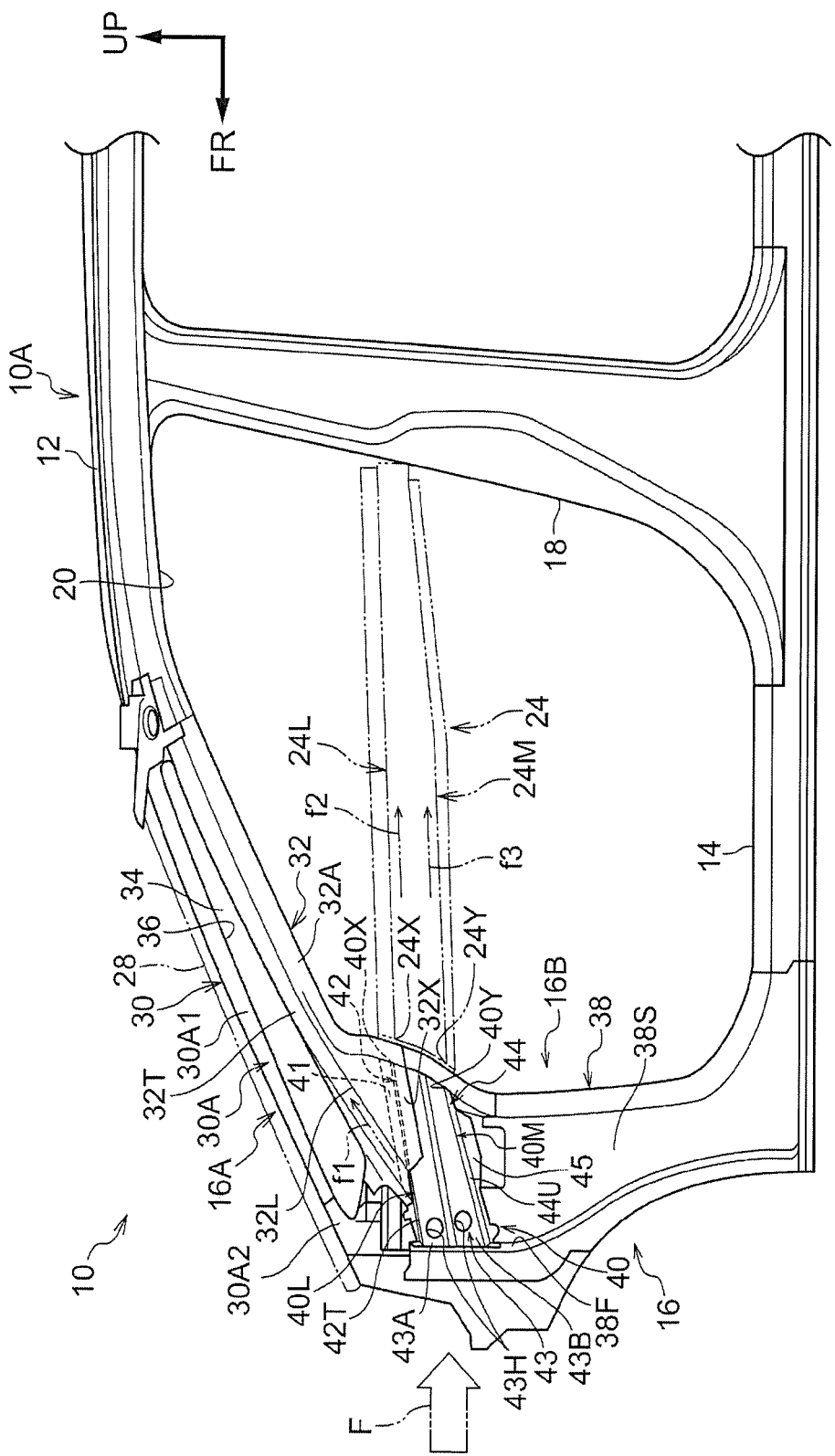
FIG. 1 is a side view showing a part of a vehicle side portion to which a vehicle side structure having a vehicle front pillar structure according to an embodiment of the present disclosure is applied, when viewed from the inside in a vehicle width direction.
Figure 2:
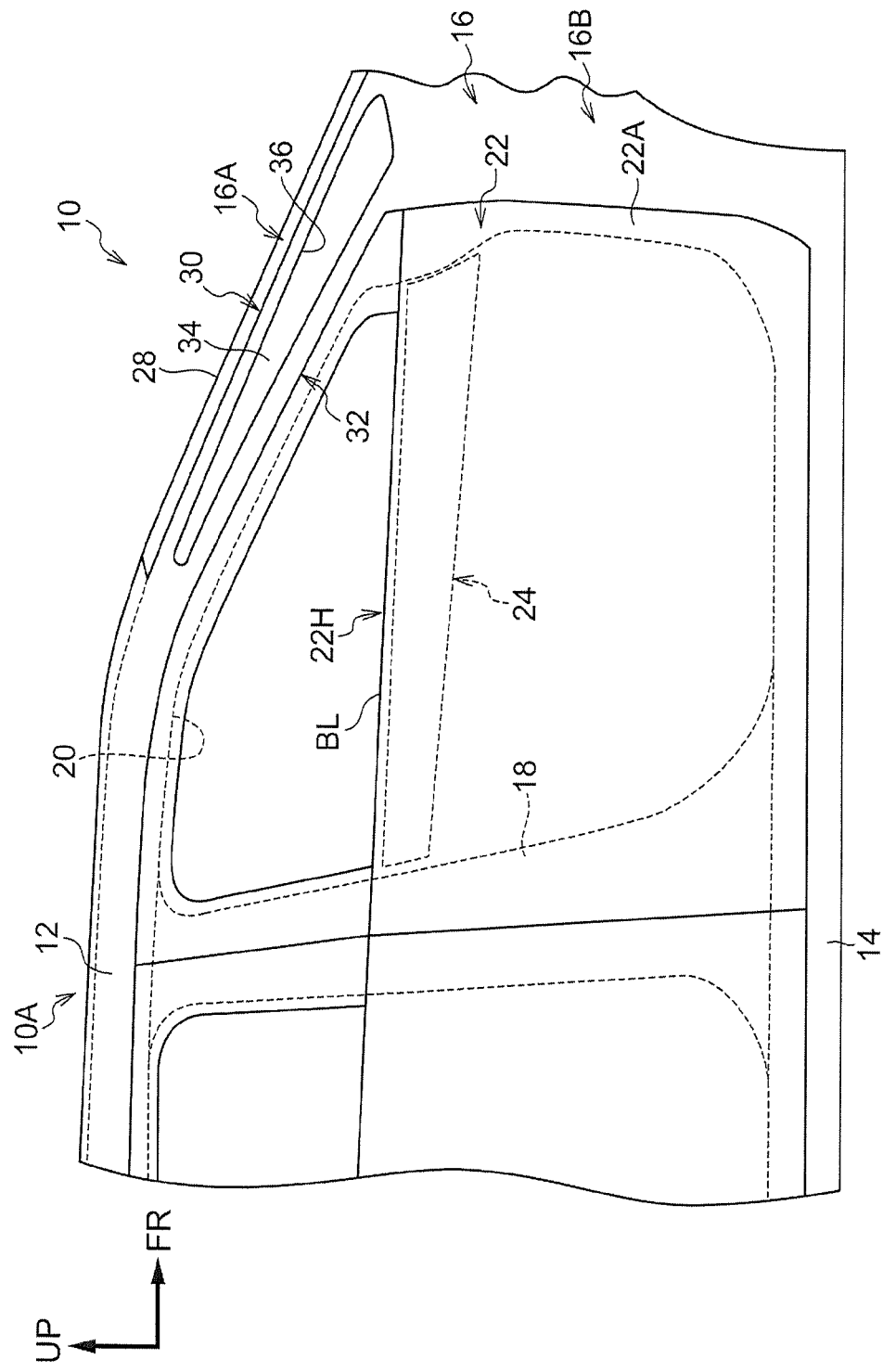
FIG. 2 is a side view showing a part of a vehicle to which the vehicle side structure of FIG. 1 is applied, when viewed from a vehicle right side.
Figure 3:
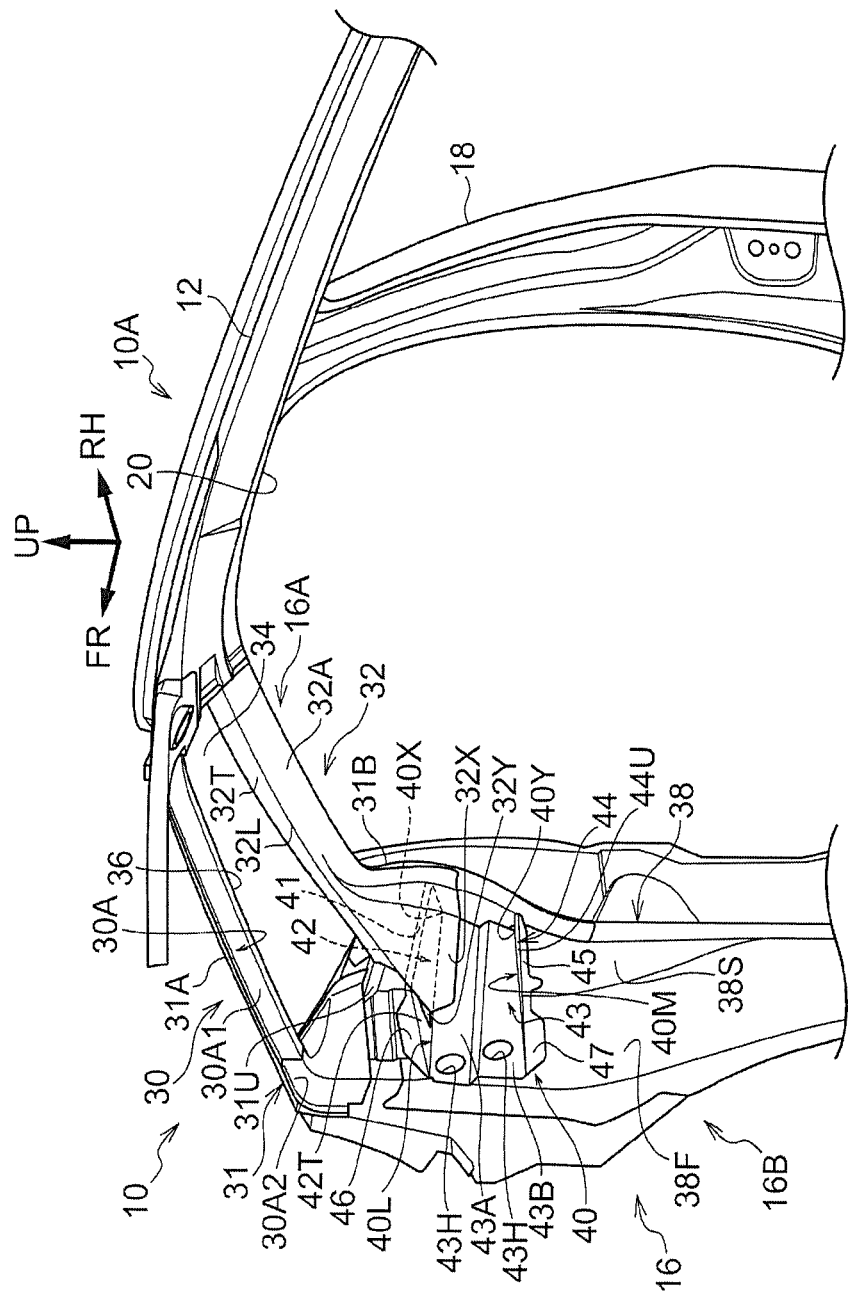
FIG. 3 is a perspective view showing a part of the vehicle side portion shown in FIG. 1, when viewed from the inside and an obliquely rear side in the vehicle width direction.

A vehicle side structure having a vehicle front pillar structure according to an embodiment of the present disclosure will be described with reference to FIGS. 1 to 3. In the drawings, an arrow FR indicates a vehicle front side, an arrow UP indicates a vehicle upper side, and an arrow RH indicates a vehicle right side. FIGS. 1 to 3 show a structure on a right side of a vehicle 10. Although a structure on a left side of the vehicle 10 is not illustrated, the structure on the left side of the vehicle 10 is bilaterally symmetrical to that on the right side of the vehicle 10.

Structure of the Embodiment

FIG. 2 is a side view showing a part of the vehicle 10 to which the vehicle side structure having the vehicle front pillar structure according to the embodiment is applied, when viewed from a vehicle right side. As shown in the drawing, a roof side rail 12 is disposed in an upper portion of a vehicle side portion 10A, and the roof side rail 12 extends in a vehicle longitudinal direction. On the other hand, a rocker 14 is disposed in a lower portion of the vehicle side portion 10A. The rocker 14 extends in the vehicle longitudinal direction.

A front pillar 16 is erected from a front end of the rocker 14 in a vehicle upward direction. A top end of the front pillar 16 is connected to a front end of the roof side rail 12. A pillar lower portion 16B, which constitutes a lower portion of the front pillar 16, is erected approximately vertically. On the other hand, the pillar upper portion 16A, which constitutes an upper portion of the front pillar 16, is inclined in a vehicle upward direction on its vehicle rear side. Between a pair of right and left pillar upper portions 16A, a windshield 28 is fitted. Furthermore, a center pillar 18 is erected in the vehicle upward direction from a middle portion of the rocker 14 in the vehicle longitudinal direction, and a top end of the center pillar 18 is connected to a middle portion of the roof side rail 12 in the vehicle longitudinal direction. FIG. 2 shows the vehicle side portion between the front pillar 16 and a portion on the vehicle rear side of the center pillar 18.

Each of the roof side rail 12, the rocker 14, the front pillar 16, and the center pillar 18, described above, has a closed cross-section structure, and constitutes a vehicle frame member. A front door opening portion 20, which is enclosed with the roof side rail 12, the front pillar 16, the rocker 14, and the center pillar 18, is formed on a front side of the vehicle side portion 10A.

In other words, the roof side rail 12 is disposed on an upper edge of the front door opening portion 20 along the vehicle longitudinal direction, and the rocker 14 is disposed on a lower edge of the front door opening portion 20 along the vehicle longitudinal direction. The front pillar 16 is disposed on a front edge of the front door opening portion 20 along a vehicle vertical direction, and the center pillar 18 is disposed on a rear edge of the front door opening portion 20 along the vehicle vertical direction. Furthermore, in the front pillar 16, the pillar lower portion 16B is disposed on the front edge of a lower half of the front door opening portion 20, and the pillar upper portion 16A is disposed on the front edge of an upper half of the front door opening portion 20. The front door opening portion 20 communicates between the outside and inside of the vehicle. The front door opening portion 20 is opened and closed through a front side door 22.

The front side door 22 includes a not-illustrated door inner panel that is disposed inside the vehicle, and a door outer panel 22A that is disposed outside the door inner panel. The door inner panel and the door outer panel 22A form a door body 22H. Inside the door body 22H of the front side door 22, a belt line reinforcing member 24 that is disposed along a belt line BL, such that its longitudinal direction coincides with the vehicle longitudinal direction, is provided. As an example, the belt line reinforcing member 24 is formed in the shape of a hat in cross section orthogonal to the longitudinal direction, along approximately the entire length in the longitudinal direction, in such a manner that its opening portion faces the inside in a vehicle width direction. In the belt line reinforcing member 24, an upper ridge 24L and a lower ridge 24M (both shown in FIG. 1), which function as a first ridge extending in the vehicle longitudinal direction, in a closed state of the front side door 22, are formed.

Next, the pillar upper portion 16A and a peripheral structure thereof will be described in detail. FIG. 1 is a side view showing a part of the vehicle side portion 10A to which the vehicle side structure having the vehicle front pillar structure according to the embodiment is applied, when viewed from the inside in the vehicle width direction. Note that, in FIG. 1, the windshield 28 is illustrated by a chain double-dashed line, and the position of the belt line reinforcing member 24, in the closed state of the front side door 22 (refer to FIG. 2), is illustrated by chain double-dashed lines. FIG. 3 is a perspective view showing a part of the vehicle side portion 10A, when viewed from the inside in the vehicle width direction and an obliquely rear side.

As shown in FIG. 1, the pillar lower portion 16B, which is continuously provided on a vehicle lower side of the pillar upper portion 16A, includes an outer panel 38. The outer panel 38 constitutes a vehicle interior outside portion of the pillar lower portion 16B. The outer panel 38 includes a sidewall 38S that extends in the vehicle vertical direction and the vehicle longitudinal direction, and a front vertical wall 38F that extends from a front end of the sidewall 38S to the inside in the vehicle width direction in a curved manner. The front vertical wall 38F extends in the vehicle vertical direction and the vehicle width direction in a range including an upper portion of the pillar lower portion 16B. An upper portion of the front vertical wall 38F constitutes a front upper portion of the pillar lower portion 16B in the vehicle longitudinal direction. The outer panel 38 of the pillar lower portion 16B and a not-illustrated inner panel, which constitutes a vehicle interior inside portion of the pillar lower portion 16B, are joined together at front and rear flange portions thereof, so as to form a closed cross-section that extends approximately in the vehicle vertical direction.

As shown in FIGS. 1 and 3, the pillar upper portion 16A includes a first pillar frame 30 and a second pillar frame 32.

As shown in FIG. 1, the first pillar frame 30 extends along an outer edge of the windshield 28 of the vehicle 10 in the vehicle width direction. A top end of the first pillar frame 30 is secured to the front end of the roof side rail 12, and a bottom end of the first pillar frame 30 is secured to a top end of the pillar lower portion 16B. The first pillar frame 30 is formed in the shape of a hollow column. In the first pillar frame 30, for example, a front upper inner reinforcing member 30A and a front upper portion 31A of a frame-shaped outer reinforcing member 31, which are shown in FIG. 3, are joined so as to form an approximately rectangular closed cross-section, when viewed from the longitudinal direction (extending direction).

The front upper inner reinforcing member 30A is formed into the shape of an opened cross-section that is opened in a vehicle front upper side, as a whole. In this embodiment, the front upper inner reinforcing member 30A is constituted of a first inner reinforcing member 30A1 and a second inner reinforcing member 30A2 that are joined together. The first inner reinforcing member 30A1 constitutes a most part of a vehicle interior portion of the first pillar frame 30. The second inner reinforcing member 30A2 constitutes a bottom end portion of the vehicle interior portion of the first pillar frame 30, and is joined to a bottom end of the first inner reinforcing member 30A1.

The second pillar frame 32 is disposed on a vehicle rear side of the first pillar frame 30 so as to form a gap therebetween. The second pillar frame 32 extends in the extending direction of the first pillar frame 30. A top end of the second pillar frame 32 is secured to the front end of the roof side rail 12, and a bottom end of the second pillar frame 32 is secured to the top end of the pillar lower portion 16B. A window 36 is thereby formed such that the first pillar frame 30 and the second pillar frame 32 constitute long sides. The second pillar frame 32 is formed in the shape of a hollow column. In the second pillar frame 32, for example, a rear lower inner reinforcing member 32A and a rear lower portion 31B of the frame-shaped outer reinforcing member 31 are joined so as to form an approximately rectangular closed cross-section, when viewed from the longitudinal direction (extending direction).

The rear lower inner reinforcing member 32A is formed in the shape of an opened cross-section that is opened outside in the vehicle width direction, as a whole. The rear lower inner reinforcing member 32A includes a portion to form a top surface 32T of the second pillar frame 32. Note that, the outer reinforcing member 31 is constituted of the front upper portion 31A and the rear lower portion 31B that are connected at their upper and bottom ends, into a frame shape. The outer reinforcing member 31 is joined to the roof side rail 12 by welding, at its top end. The outer reinforcing member 31 is joined to a portion including a top end of the outer panel 38 of the pillar lower portion 16B, at its bottom end 31U.

A transparent member 34 straddles between the first pillar frame 30 and the second pillar frame 32. The transparent member 34 extends in the longitudinal direction of the pillar upper portion 16A. The transparent member 34 is made of a transparent material, e.g. inorganic glass, high-strength transparent resin, or the like, into a plate shape. As the high-strength transparent resin, there is a polycarbonate reinforced with glass fiber (PC-GF), a polycarbonate reinforced with cellulose nanofiber (PC-CNF), or the like.

As shown in FIGS. 1 and 3, a bulkhead 40, which functions as a load transmission member, is disposed on a lower side of the bottom end of the first pillar frame 30. The bottom end of the first pillar frame 30 and the bulkhead 40 are separated. The bulkhead 40 is joined to the upper portion of the pillar lower portion 16B, and is joined to bottom ends 32X and 32Y (refer to FIG. 3) of the rear lower inner reinforcing member 32A of the second pillar frame 32.

The bulkhead 40 is a bent plate member made of metal. The bulkhead 40 is disposed in a closed cross-section of the pillar lower portion 16B, and is formed approximately in the shape of a hat, in vertical cross section, such that its opening portion faces the outside in the vehicle width direction. An upper flange 41 and a lower flange 45 of the bulkhead 40 are joined to the sidewall 38S of the outer panel 38 of the pillar lower portion 16B by welding.

The bulkhead 40 includes an inner vertical wall 43 that constitutes an inner portion in the vehicle width direction and that extends, as a whole, in the vehicle vertical direction and the vehicle longitudinal direction. As an example, in this embodiment, the inner vertical wall 43 is constituted of an upper portion 43A and a lower portion 43B connected through a step portion. The lower portion 43B is situated outside the upper portion 43A in the vehicle width direction. The upper portion 43A of the inner vertical wall 43 is joined to the bottom end 32X of the rear lower inner reinforcing member 32A of the second pillar frame 32, at its rear portion in the vehicle longitudinal direction, by welding (for example, by spot welding). Holes 43H for use in welding operation are penetratingly formed in a front portion of the inner vertical wall 43 in the vehicle longitudinal direction. The inner vertical wall 43 is integrally connected to the upper flange 41 through an upper connection portion 42, and is integrally connected to the lower flange 45 through a lower connection portion 44.

As shown in FIG. 1, a top surface 42T of the upper connection portion 42 of the bulkhead 40 is inclined in the vehicle upward direction on its vehicle rear side. To a middle portion of the top surface 42T of the upper connection portion 42 of the bulkhead 40 in the vehicle longitudinal direction, the bottom end 32Y (refer to FIG. 3) of the rear lower inner reinforcing member 32A of the second pillar frame 32 is joined by welding (for example, by spot welding). The bulkhead 40 has an upper ridge 40L, as a first upper ridge, that extends linearly along an inner edge of the top surface 42T of the upper connection portion 42 in the vehicle width direction. A bottom surface 44U of the lower connection portion 44 of the bulkhead 40 is inclined in the vehicle upward direction on its vehicle rear side. The bulkhead 40 has a lower ridge 40M that extends linearly along an inner edge of the bottom surface 44U of the lower connection portion 44 in the vehicle width direction. Both of the upper ridge 40L and the lower ridge 40M, which function as a second ridge, extend in a slightly inclined manner in the vehicle upward direction, on their vehicle rear sides along the vehicle longitudinal direction.

A rear end 40X of the upper ridge 40L is set in a position that can transmit a load F from the vehicle front side to a front end 24X of the upper ridge 24L of the belt line reinforcing member 24, in the closed state of the front side door 22 (refer to FIG. 2). In other words, the rear end 40X of the upper ridge 40L is set in a position corresponding to the vehicle front side of the front end 24X of the upper ridge 24L of the belt line reinforcing member 24 (in a position that coincides with the front end 24X of the upper ridge 24L in the vehicle vertical direction and in the vehicle width direction), in the closed state of the front side door 22 (refer to FIG. 2).

A rear end 40Y of the lower ridge 40M is set in a position that can transmit a load F from the vehicle front side to a front end 24Y of the lower ridge 24M of the belt line reinforcing member 24, in the closed state of the front side door 22 (refer to FIG. 2). In other words, the rear end 40Y of the lower ridge 40M is set in a position corresponding to the vehicle front side of the front end 24Y of the lower ridge 24M of the belt line reinforcing member 24 (in a position that coincides with the front end 24Y of the lower ridge 24M in the vehicle vertical direction and in the vehicle width direction), in the closed state of the front side door 22 (refer to FIG. 2).

As shown in FIG. 3, the bulkhead 40 includes a front upper flange 46 that curvedly extends from a front end of the upper connection portion 42 to the vehicle upward direction, and a front lower flange 47 that curvedly extends from a front end of the lower connection portion 44 to a vehicle downward direction. The bulkhead 40 is disposed in a state of being bumped against the front vertical wall 38F of the outer panel 38 of the pillar lower portion 16B, and the front upper flange 46 and the front lower flange 47 are joined to the front vertical wall 38F by welding (for example, by spot welding). Accordingly, the bulkhead 40 can transmit a load that is applied from the vehicle front side to the front vertical wall 38F of the outer panel 38, in the upper portion of the pillar lower portion 16B, to the second pillar frame 32.

On the other hand, as shown in FIG. 1, the top surface 32T of the second pillar frame 32 is disposed continuously from the top surface 42T of the upper connection portion 42 of the bulkhead 40, and linearly extends to a vehicle rearward and upward direction. The second pillar frame 32 has an upper ridge 32L, as a second upper ridge, that extends linearly along an inner edge of the top surface 32T of the second pillar frame 32 in the vehicle width direction. The upper ridge 32L of the second pillar frame 32 is disposed continuously from the upper ridge 40L of the bulkhead 40.

Operation and Effects of Embodiment

Next, the operation and effects of the above embodiment will be described.

As shown in FIG. 1, since the transparent member 34 straddles between the first pillar frame 30 and the second pillar frame 32, an occupant inside the vehicle can view the outside of the vehicle through the transparent member 34 between the first pillar frame 30 and the second pillar frame 32. To the bulkhead 40 joined to the upper portion of the pillar lower portion 16B, the bottom ends 32X and 32Y (refer to FIG. 3) of the rear lower inner reinforcing member 32A of the second pillar frame 32 are joined. The bulkhead 40 can transmit a load F that is applied from the vehicle front side to the front vertical wall 38F of the outer panel 38, in the upper portion of the pillar lower portion 16B, to the second pillar frame 32.

Since the top surface 32T of the second pillar frame 32 is disposed continuously from the top surface 42T of the bulkhead 40 and extends linearly in the vehicle rearward and upward direction, a part of a load F that is applied from the vehicle front side to the front pillar 16, in a frontal collision, is transmitted along the top surface 42T of the bulkhead 40, and then is efficiently transmitted to the top surface 32T of the second pillar frame 32 (refer to an arrow f1). At this time, the second pillar frame 32 can receive the load as an axial force (in a stretched state), and therefore is hard to deform. Therefore, in the frontal collision, since the second pillar frame 32 partly shares the load F that is applied to the front pillar 16, it is possible to restrain deformation of the front pillar 16, owing to the frontal collision, even if the thickness of the first pillar frame 30 is limited.

In the above embodiment, the linear upper ridge 32L of the second pillar frame 32, which is along the inner edge of the top surface 32T in the vehicle width direction, is disposed continuously from the linear upper ridge 40L of the bulkhead 40, which is along the inner edge of the top surface 42T in the vehicle width direction. Therefore, a part of the load F that is applied from the vehicle front side to the front pillar 16 in the frontal collision is more efficiently transmitted along the upper ridge 40L of the bulkhead 40 and the upper ridge 32L of the second pillar frame 32 (refer to the arrow f1).

In the above embodiment, the front vertical wall 38F of the pillar lower portion 16B extends along the vehicle vertical direction and the vehicle width direction. The bulkhead 40 is disposed in a state of being bumped against the front vertical wall 38F in the upper portion of the pillar lower portion 16B, while being joined to the front vertical wall 38F. Accordingly, a part of the load F that is applied from the vehicle front side to the front pillar 16, in the frontal collision, is efficiently transmitted from the front vertical wall 38F of the pillar lower portion 16B to the bulkhead 40.

In this embodiment, since the top surface 42T of the bulkhead 40 is inclined in the vehicle upward direction on its vertical rear side, a part of the load F that is applied from the vehicle front side to the front pillar 16, in the frontal collision, is transmitted along the top surface 42T of the bulkhead 40 to the vehicle rearward and upward direction. Therefore, the load that is transmitted along the top surface 42T of the bulkhead 40 is more efficiently transmitted to the top surface 32T of the second pillar frame 32 (refer to the arrow f1).

In this embodiment, the upper ridge 24L and the lower ridge 24M of the belt line reinforcing member 24 extend along the vehicle longitudinal direction, in the closed state of the front side door 22 (refer to FIG. 2), and the upper ridge 40L and the lower ridge 40M of the bulkhead 40 also extend along the vehicle longitudinal direction. The rear end 40X of the upper ridge 40L of the bulkhead 40 is set in a position that can transmit the load F from the vehicle front side to the front end 24X of the upper ridge 24L of the belt line reinforcing member 24, in the closed state of the front side door 22 (refer to FIG. 2). Accordingly, a part of a load that is applied from the vehicle front side to the bulkhead 40, in a frontal collision, is transmitted along the upper ridge 40L of the bulkhead 40 to the rear end 40X thereof, and then is efficiently transmitted along the upper ridge 24L of the belt line reinforcing member 24 (refer to an arrow f2). The rear end 40Y of the lower ridge 40M of the bulkhead 40 is set in a position that can transmit the load F from the vehicle front side to the front end 24Y of the lower ridge 24M of the belt line reinforcing member 24, in the closed state of the front side door 22 (refer to FIG. 2). Accordingly, a part of a load that is applied from the vehicle front side to the bulkhead 40, in a frontal collision, is transmitted along the lower ridge 40M of the bulkhead 40 to the rear end 40Y thereof, and then is efficiently transmitted along the lower ridge 24M of the belt line reinforcing member 24 (refer to an arrow f3).

Therefore, since the bulkhead 40 functions as a path (load path) to transmit the load F to the belt line reinforcing member 24, it is possible to improve collision safety performance in frontal collisions, while limiting the number of components.

As described above, according to this embodiment, even if the thickness of the first pillar frame 30, which constitutes the front side of the window 36 of the front pillar 16 in the vehicle longitudinal direction, is limited, it is possible to restrain deformation of the front pillar 16 in a frontal collision. As a result, it is also possible to favorably ensure the collision safety performance, while realizing an improvement in front visibility and a reduction in the weight of the vehicle 10.

As supplemental description, the shape of front door opening portions of vehicles (automobiles) is determined in consideration of ease of getting on and off, and the shape of front pillars of the vehicles (automobiles) is determined in consideration of the relationship with exterior design and the front door opening portions. In some instances, for example, the front pillar may have a shape that is bent in a vehicle rearward and upward direction, when viewed from a vehicle side, at an upper portion than a portion to which a load in a front collision is applied. In such a structure, since the bent portion is offset in the vehicle upward direction, relative to a load application point, the front pillar is easily deformed at the bent portion.

On the contrary, according to this embodiment, since the top surface 32T of the second pillar frame 32, on which the exterior design and the shape of the front door opening portions basically have no effect, linearly extends in the vehicle rearward and upward direction and is disposed continuously from the top surface 42T of the bulkhead 40, the load F in the frontal collision can be efficiently transmitted to the second pillar frame 32. As a result, it is possible to restrain deformation of the front pillar 16 in the front collision, while reducing cost and weight, and therefore it is possible to prevent or restrain a buckling and break of the first pillar frame 30. In other words, it is possible to favorably ensure the strength and stiffness of the front pillar 16.

Supplemental Description of the Embodiment

Note that, in the above embodiment, the bulkhead 40 is joined to the upper portion of the pillar lower portion 16B by welding, and the bottom ends 32X and 32Y (refer to FIG. 3) of the rear lower inner reinforcing member 32A of the second pillar frame 32 are joined by welding, but they may be joined by clamping using bolts, rivets, or the like, instead of welding.

In the above embodiment, the linearly extending upper ridge 32L of the second pillar frame 32 is preferably disposed continuously from the linearly extending upper ridge 40L of the bulkhead 40. However, for example, the upper ridge (32L) of the second pillar frame (32) may be disposed discontinuously from the upper ridge (40L) of the bulkhead (40).

In the above embodiment, the bulkhead 40 is preferably disposed in a state of being bumped against the front vertical wall 38F of the upper portion of the pillar lower portion 16B, while being preferably joined to the front vertical wall 38F. However, for example, the bulkhead, which functions as a load transmission member, may not be joined to the front vertical wall (38F) of the upper portion of the pillar lower portion (16B).

In the above embodiment, the top surface 42T of the bulkhead 40 is preferably inclined in the vehicle upward direction on its vehicle rear side. However, for example, the top surface of the bulkhead, which functions as a load transmission member, may extend horizontally in the vehicle longitudinal direction.

As a modification example of the embodiment, the rear end (40X) of the upper ridge (40L) of the bulkhead (40) may be set in a position that is displaced in the vehicle vertical direction from the front end (24X) of the upper ridge (24L) of the belt line RF (24). As another modification example of the embodiment, the rear end (40Y) of the lower ridge (40M) of the bulkhead (40) may be set in a position that is displaced in the vehicle vertical direction from the front end (24Y) of the lower ridge (24M) of the belt line RF (24).

Furthermore, in the above embodiment, the vehicle front pillar structure according to the present disclosure is applied to both of the pair of right and left front pillars 16. However, the vehicle front pillar structure according to the present disclosure may be applied to only the front pillar (16) on the side of a driver's seat.

Note that, the above embodiment and the above plurality of modification examples may be appropriately performed in combination.

The exemplary embodiment of the present disclosure is described above, but the present disclosure is not limited to the above. As a matter of course, the present disclosure can be variously modified and performed in a range without departing from the scope of the present disclosure, in addition to the above.

What is claimed is:

1. A vehicle front pillar structure comprising:
   a pillar lower portion that configures a lower portion of a front pillar;
   a hollow, column-shaped first pillar frame that extends along an outer edge of a windshield of a vehicle in a vehicle width direction, a bottom end of the first pillar frame being secured to a top end of the pillar lower portion;
   a hollow, column-shaped second pillar frame that is provided on a vehicle rear side of the first pillar frame so as to form a gap, the second pillar frame extending in an extending direction of the first pillar frame, and a bottom end of the second pillar frame being secured to the top end of the pillar lower portion;
   a transparent member that is made of a transparent material, the transparent member straddling between the first pillar frame and the second pillar frame; and
   a load transmission member that is disposed on a vehicle lower side of the bottom end of the first pillar frame, the load transmission member being disposed in a closed cross-section of the pillar lower portion and joined to an upper portion of the pillar lower portion, and the bottom end of the second pillar frame being joined to the load transmission member, such that the load transmission member can transmit a load applied from a vehicle front side to a front side portion of the upper portion of the pillar lower portion in a vehicle longitudinal direction, to the second pillar frame,
   wherein a top surface of the second pillar frame is disposed continuously from a top surface of the load transmission member, and the top surface of the second pillar frame linearly extends in a vehicle rearward and upward direction.

2. The vehicle front pillar structure according to claim 1, wherein:
   the load transmission member includes a first upper ridge that linearly extends along an inner edge of the top surface of the load transmission member in the vehicle width direction; and
   the second pillar frame includes a second upper ridge that linearly extends along an inner edge of the top surface of the second pillar frame, and the second upper ridge is disposed continuously from the first upper ridge.

3. The vehicle front pillar structure according to claim 1, wherein:
   the front side portion of the upper portion of the pillar lower portion, in the vehicle longitudinal direction, has a front vertical wall extending along a vehicle vertical direction and the vehicle width direction; and
   the load transmission member is disposed in a state of being bumped against the front vertical wall, and the load transmission member is configured to have a portion that is joined to the front vertical wall.

4. The vehicle front pillar structure according to claim 1, wherein the top surface of the load transmission member is inclined in a vehicle upward direction on a vehicle rear side.

5. A vehicle side structure comprising:
   a front pillar to which the vehicle front pillar structure according to claim 1 is applied;
   a front side door that opens and closes a front door opening portion in a vehicle side, the front pillar being provided at a front edge of the front door opening portion; and
   a belt line reinforcing member that is provided inside the front side door, the belt line reinforcing member being disposed along a belt line, and the belt line reinforcing member including a first ridge extending along the vehicle longitudinal direction, in a closed state of the front side door,
   wherein the load transmission member includes a second ridge extending along the vehicle longitudinal direction, and a rear end of the second ridge is set in a position that can transmit a load from a vehicle front side to a front end of the first ridge, in the closed state of the front side door.

6. A vehicle front pillar structure comprising:
   a pillar lower portion that configures a lower portion of a front pillar;
   a hollow, column-shaped first pillar frame that extends along an outer edge of a windshield of a vehicle in a vehicle width direction, a bottom end of the first pillar frame being secured to a top end of the pillar lower portion;
   a hollow, column-shaped second pillar frame that is provided on a vehicle rear side of the first pillar frame so as to form a gap, the second pillar frame extending in an extending direction of the first pillar frame, and a bottom end of the second pillar frame being secured to the top end of the pillar lower portion;
   a transparent member that is made of a transparent material, the transparent member straddling between the first pillar frame and the second pillar frame; and
   a load transmission member that is disposed on a vehicle lower side of the bottom end of the first pillar frame, the load transmission member being joined to an upper portion of the pillar lower portion, and the bottom end of the second pillar frame being joined to the load transmission member, such that the load transmission member can transmit a load applied from a vehicle front side to a front side portion of the upper portion of the pillar lower portion in a vehicle longitudinal direction, to the second pillar frame, wherein
   a top surface of the second pillar frame is disposed continuously from a top surface of the load transmission member, and the top surface of the second pillar frame linearly extends in a vehicle rearward and upward direction;
   the load transmission member includes a first upper ridge that linearly extends along an inner edge of the top surface of the load transmission member in the vehicle width direction; and
   the second pillar frame includes a second upper ridge that linearly extends along an inner edge of the top surface of the second pillar frame, and the second upper ridge is disposed continuously from the first upper ridge.

\* \* \* \* \*